United States Patent [19]

Takada et al.

[11] 4,300,505

[45] Nov. 17, 1981

[54] AIR FUEL RATIO CONTROL DEVICE

[75] Inventors: Shigetaka Takada, Ohbu; Kazusato Kasuya, Kariya; Yukihiro Watanabe, Nagoya, all of Japan

[73] Assignee: Aisan Industry Co., Ltd., Aichi, Japan

[21] Appl. No.: 56,757

[22] Filed: Jul. 12, 1979

[30] Foreign Application Priority Data

Aug. 7, 1978 [JP] Japan .................................. 53-95995

[51] Int. Cl.³ ........................ F02M 23/04; F02B 3/00; F02B 75/10
[52] U.S. Cl. .................................. 123/445; 123/489; 123/434
[58] Field of Search ....... 123/119 EE, 119 D, 32 EE, 123/32 EA; 60/276, 285

[56] References Cited

U.S. PATENT DOCUMENTS

| | | | |
|---|---|---|---|
| 4,107,920 | 8/1978 | Minami et al. | 123/119 EC |
| 4,134,375 | 1/1979 | Koseki et al. | 123/119 D |
| 4,153,022 | 5/1979 | Asano et al. | 123/32 EE |

*Primary Examiner*—Charles J. Myhre
*Assistant Examiner*—R. A. Nelli

[57] ABSTRACT

An air-fuel ratio control device capable of accurately controlling the air-fuel ratio of the mixture to be supplied to the engine, without being affected by the external conditions such as the atmospheric pressure and the temperature of the air drawn into the engine. The control signal of the air-fuel ratio control device contains a sensitivity component whose magnitude varies in proportion to a time of duration for which the "rich" or "lean" input signal has continued, so that the air-fuel ratio of the mixture can be properly controlled for all engine running conditions, i.e., either when the engine is running under a light load condition or under a heavy load condition.

4 Claims, 3 Drawing Figures

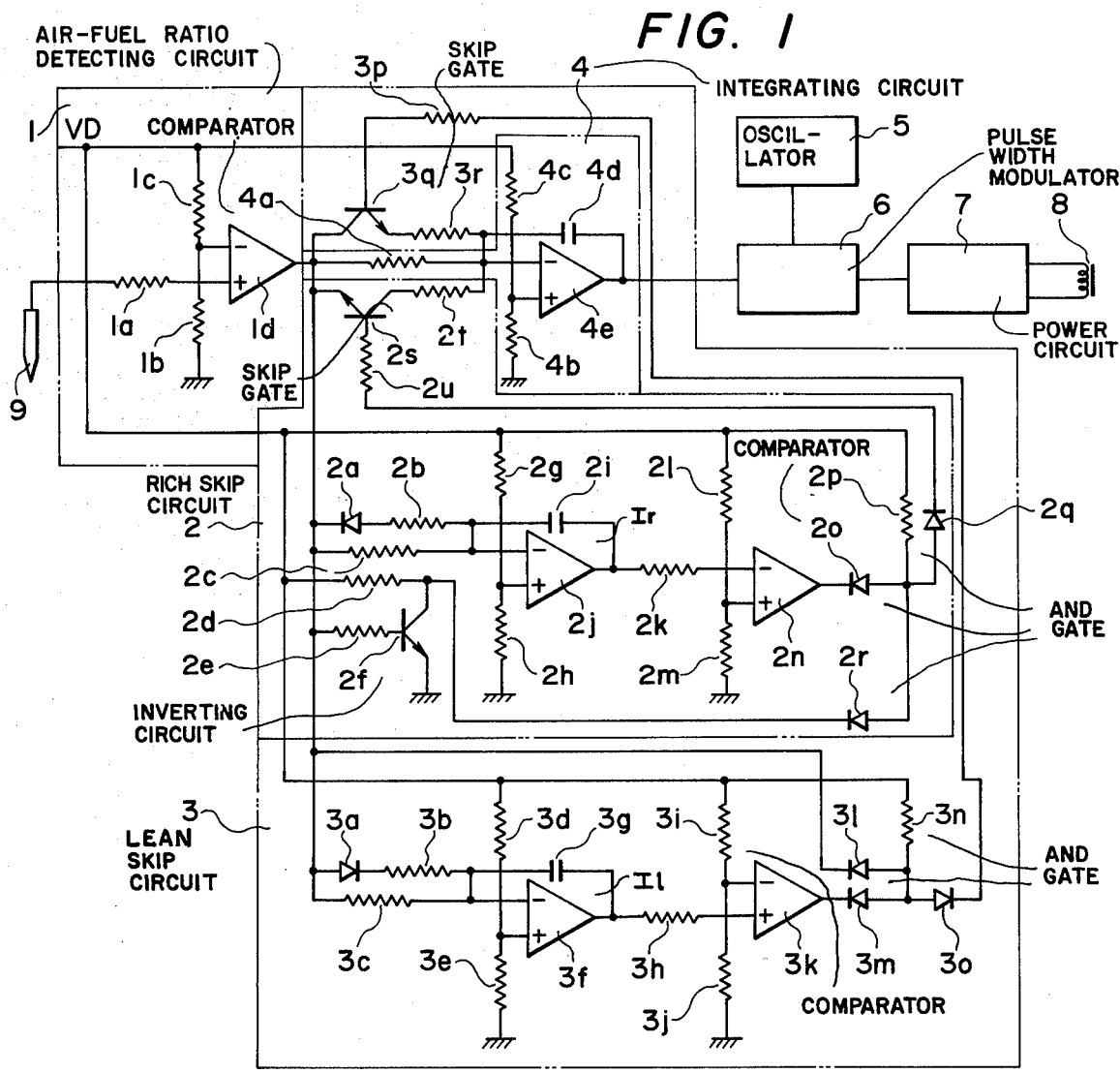
FIG. 1
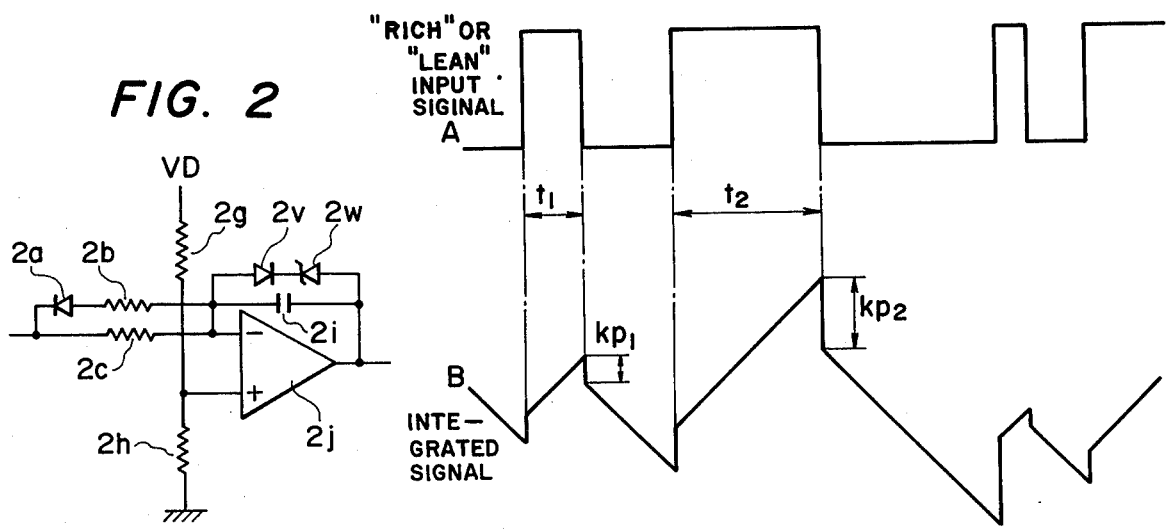
FIG. 2
FIG. 3

AIR FUEL RATIO CONTROL DEVICE

BACKGROUND OF THE INVENTION

This invention relates to an air-fuel ratio feedback control device which controls the air-fuel ratio of the fuel mixture to be supplied to an engine by detecting the content of oxygen contained in the exhaust gas discharged from the engine.

The air-fuel mixture control device presently in use employs the following method to reduce the noxious components in the exhaust gas discharged from the engine. That is, the air-fuel ratio of the fuel mixture is controlled at a value near the theoretical air-fuel ratio by detecting the density of oxygen contained in the exhaust gas. This method enables an effective use of catalysts and is characterized by its ability to control the air-fuel ratio without being affected by changes in the external conditions such as atomospheric pressure and suction air temperature.

The control signals that are used in the conventional air-fuel ratio control device have two components: one is a sensitivity component whose magnitude is proportional to the level of the input signal based on a detected air-fuel ratio and the other is an integrated component obtained by integrating the input signal over time. Since the input signal takes either of two predetermined values—e.g., 4 volts when the mixture is rich and 0 volts when it is lean—and varies stepwise between these two values, the sensitivity component of the control signal proportional to the input signal has a constant voltage range. The time lag of the control system including the engine varies according to the quantity of the suction air. When the amount of air introduced into the engine is small, the time lag is large. When the amount of air introduced into the engine is large, the time lag is small. Thus, if the sensitivity component of the control signal proportional to the input signal is set for the operating range where the amount of suction air is small, the control may become too sensitive when a large amount of air is introduced, resulting in a low response speed. This may also cause a surging of the control system. On the contrary, if the sensitivity component of the control signal is set for the operating range where the quantity of air is large, the time lag may become excessive when only a small amount of air is introduced. This also decreases the response speed and the controllability of the system deteriorates.

SUMMARY OF THE INVENTION

This invention has been accomplished in the light of the above-mentioned drawbacks. It is therefore an object of the present invention to provide an air-fuel ratio control device capable of accurately controlling the air-fuel ratio of the mixture to be supplied to the engine, without being affected by the external conditions such as atmospheric pressure and temperature of the air drawn into the engine.

To achieve this objective, an air-fuel ratio control device according to this invention is so constructed that the sensitivity component of the control signal that is proportional to the input signal value is varied according to the duration of the input signal—"rich" or "lean" signal.

BRIEF DESCRIPTION OF THE DRAWING

FIG. 1 is a control circuit diagram of one embodiment according to the present invention;

FIG. 2 is a circuit diagram of a device for limiting the output of a Miller integrator; and FIG. 3 is a diagram showing the relation between the air-fuel ratio detecting signal ("rich-lean" signal) and an integrated signal.

DESCRIPTION OF THE PREFERRED EMBODIMENTS

In FIG. 1, air-fuel ratio detecting circuit 1 is operatively connected to a rich skip circuit 2 and a lean skip circuit 3 which in turn are connected to an integrating circuit 4. The integrating circuit and a triangular wave oscillating circuit 5 are connected to a pulse width modulating circuit 6, which in turn is connected to a power circuit 7 to which an actuator 8 is connected. An exhaust sensor 9 is connected into the detecting circuit 1.

Example embodiments of the air-fuel ratio control device used in the carburetor will be described with reference to FIGS. 1 to 3.

The control circuit of this invention comprises, as shown in FIG. 1, the air-fuel ratio detecting circuit 1, the circuit 2 that determines the sensitivity of the control signal to the inversion from "rich" to "lean" of the signal from the air-fuel ratio detecting circuit (this circuit 2 shall be called a "rich skip circuit" hereinafter), the circuit 3 that determines the sensitivity of the control signal to the inversion of the input signal from "lean" to "rich" (lean skip circuit), the integrating circuit 4, the triangular wave oscillating circuit 5, the pulse width modulating circuit 6, and the power circuit 7. The actuator 8 e.g., may be an electromagnetic valve. The air-fuel ratio detecting circuit 1 consists of resistors 1a, 1b and 1c connected to a comparator 1d. The inverting input terminal of the comparator 1d is applied with a constant voltage (reference voltage) determined by the voltage ratio between the resistors 1b and 1c.

The rich skip circuit 2 comprises resistors 2b, 2c, 2d, 2e, 2g, 2h, 2k, 2l 2m, 2p, 2t and 2u, diodes 2a, 2o, 2g and 2r, transistors 2f and 2s and a capacitor 2i operatively connected as illustrated. The operational amplifier 2j of this circuit, together with a capacitor 2i and resistors 2b and 2c, constitute a Miller integrator Ir. A time constant of the integrator is determined by the capacitor 2i and the resistor 2c, and another time constant is determined by the capacitor 2i and resistors 2b and 2c. The operational amplifier 2n functions as a comparator which compares the output of the Miller integrator Ir with a constant voltage determined by the voltage ratio between the resistors 2m and 2l. The transistor 2f and the resistors 2d and 2e form an inverting circuit, and the diodes 2o and 2r and the resistor 2p constitute and AND circuit. The transistor 2s and the resistors 2u and 2t cause the integrated value of the integrating circuit 4 to skip.

The lean skip circuit 3 comprises resistors 3b, 3c, 3d, 3e, 3h, 3i, 3j, 3n, 3p and 3r, diodes 3a, 3l, 3m and 3o, a transistor 3g, operational amplifiers 3f and 3k, and a capacitor 3g. The operational amplifier 3f, together with the capacitor 3g and the resistors 3b and 3c, constitute a Miller integrator Il. The operational amplifier 3k functions as a comparator. The diodes 3l and 3m and the resistor 3n form an AND circuit, and the resistor 3p and 3r and the transistor 3g cause the integrated value of the integrating circuit 4 to skip. The integrating circuit 4 comprises resistors 4a, 4b and 4c and a capacitor 4d, connected to or operational amplifier 4e thereof.

The output of the exhaust gas sensor 9 is compared by the comparator 1d with a constant voltage (reference voltage) which is obtained by dividing line voltage Vd by the resistors 1c and 1b. The output of comparator 1d becomes "high" when the output of the exhaust gas sensor 9 is higher than the reference voltage (or when the fuel is rich in the air-fuel ratio), and "low" when the output of the sensor 9 is lower than the reference voltage (or when the fuel is lean). When the input signal changes from "lean" to "rich", the output current of the comparator 1d flows through the resistor 2c and charges the capacitor 2i, and the output of the operational amplifier 2j decreases at a constant rate. When the input signal changes to "lean", the charge in the capacitor 2i will be discharged mainly through the resistor 2b and the diode 2a—if the resistor 2b is set sufficiently smaller than that of the resistor 2c—and the output of the operational amplifier 2j will reach the upper limit in a short time. The time after the signal has changed from "rich" to "lean" until the output of the operational amplifier 2j reaches the upper limit depends on how low the output of the operational amplifier was when the inversion of the signal occurred, or how long the "rich" signal had continued. If the non-inverting input terminal voltage of the comparator 2n is set slightly lower than the upper limit of the output of the operational amplifier 2j, the output of the comparator 2n remains "high" after the signal has changed from "rich" to "rich" until the output of the operational amplifier 2j reaches the upper limit. the voltage of the collector of the transistor 2f becomes "low" when the output of the comparator 1d is "high", and becomes "high" when the comparator output is "low". By sending both the output signal of the comparator 2n and the collector signal of the transistor 2f to the AND gate, it is possible, at a time of signal inversion from "rich" to "lean", to produce a pulse signal Pr having a pulse width almost proportional to the time during which the preceding "rich" signal has continued. Likewise, when the signal changes from "lean" to "rich", the lean skip circuit 3 also produces a pulse signal Pl whose pulse width is proportional to the duration of the "lean" signal.

The time constant of the integrating circuit 4 is determined by the resistor 4a and the capacitor 4d. When the input signal shifts from "rich" to "lean", the pulse signal Pr turns on the transistor 2s and the charge in the capacitor 2i rapidly discharges through the resistor 2b causing the integrated value of the integrating circuit 4 to increase sharply. Since the magnitude in voltage of the sensitivity component is determined by the duration of the pulse signal Pr, the sensitivity of the control signal is almost proportional to the duration of the "rich" signal. Likewise, when the input signal changes from "lean" to "rich", the sensitivity component produced will be proportional to the duration of the "lean" signal. It is possible to set at a desired value the lower output limit of the Miller integrator in the rich skip circuit. This will be detailed in the following with reference to FIG. 2 which illustrates the Miller integrator. The Miller integrator in FIG. 2 has the same components and arrangement as in FIG. 1, and is denoted with the same reference characters. However here a diode 2v and a zener diode 2w connected in series facing each other in their conducting directions are connected across the capacitor 2. When the output of the Miller integrator reaches the lower limit, the pulse width of the pulse signal Pr produced by the input signal inversion from "rich" to "lean" will be saturated and will not vary even though the "rich" signal continues thereafter. It is also possible to place the upper limit on the output of the Miller integrator in the lean skip circuit.

The relation between the input signal ("rich" or "lean") based on the detected air-fuel ratio and the integrated signal is shown in FIG. 3, in which A represents the "rich" or "lean" signal, and B represents the integrated signal, t1 and t2 represents the time of duration of the "rich" signal, and Kp1 and Kp2 are the sensitivities which are proportional to the time of duration of the "rich" signal.

In the operating range where the quantity of suction air is small and therefore the time lag in the feed back system including the engine is large, the response speed is slow for the control system which employs the conventional constant sensitivity method. However, with the control method of this invention, the response sensitivity to the input signal inversion between "rich" and "lean" increases in proportion to the duration of the "rich" or "lean" signal. Therefore, the time lag is shortened as the duration of the signal becomes long, thereby increasing the response speed of the system.

When the quantity of suction air increases and the time lag becomes small, the control system of the constant sensitivity method will become too sensitive. But in the control system using the present invention, the sensitivity decreases as the response speed increases, enabling accurate and rapid control.

To sum up, the steps in the operation of the air-fuel ratio control device according to this invention are as follows:

(1) the time constant of the Miller integrator Il in the lean skip circuit is made equal to the time constant of the Miller integrator Ir in the rich skip circuit;
(2) the voltage difference between the upper and lower limits of the output of the Miller integrator Il is set larger than that of the Miller integrator Ir;
(3) the reference voltage in the air-fuel ratio detecting circuit 1 is chosen at an appropriate value;
(4) in the light load operation during which the response speed of the control system is relatively slow, the output of the Miller integrator Ir is saturated and the sensitivity of the control signal to the inversion of the input signal from "lean" to "rich" is greater than the sensitivity to the input signal inversion from "rich" to "lean" so that the air-fuel ratio is made slightly leaner than the theoretical ratio to reduce carbon monoxides and hydrocarbons; and
(5) in the high load operation during which the response speed of the control system is high, the output of the Miller integrator Ir is not saturated and the sensitivities are equal for both input signal inversions from "lean" to "rich" and from "rich" to "lean" so that the air-fuel ratio may become slightly richer than the theoretical one, thereby reducing nitric oxides.

With this device, these functions can be performed without needing any special detector. The air-fuel ratio can, of course, be varied by changing the time constants of the Miller integrators Il and Ir.

What is claimed is:
1. An air-fuel ratio control device comprising, means comprising an exhaust gas sensor provided in an exhaust system of an internal combustion engine supplied with an air-fuel mixture for detecting the concentration of exhaust gas components, means comprising a control circuit for determining from a signal sent from said exhaust gas sensor whether the air-fuel mixture is lean or rich providing a "rich" or "lean" input signal, and thereafter generating a control signal based on the "rich" or "lean" signal, and a fuel supply means for controlling the air-fuel ratio of the air-fuel mixture according to the control signal from the control circuit and supplying the controlled air-fuel mixture to the engine, means comprising said control circuit for providing said control signal with a proportional sensitivity component with a magnitude of said proportional sensitivity component such that said magnitude is substantially proportional to the duration of the "rich or "lean" signal, said control circuit comprises, a comparator means connected to said exhaust gas sensor and to a reference voltage for providing said "rich" or "lean" input signal at an output of said comparator means, a "rich" skip circuit and a "lean" skip circuit connected to said output, an integrating circuit connected to said output of said comparator means and to said skip circuits, said skip circuits comprise means for providing said proportional sensitivity component, each of said skip circuits comprises, a Miller integrator having a capacitor, said Miller integrator is connected to the output of said comparator means and to a predetermined reference voltage, said Miller integrator is adapted to have a Miller integrator output of an upper limit, a comparator having one input connected to the Miller integrator output and another input connected to a reference value set slightly lower than said upper limit, a skip gate means operatively connected to said capacitor and to said integrating circuit, and AND gate having one input connected to an output of said comparator and another input operatively connected to said output of said comparator means and having an output connected to said skip gate means, said skip gate means for causing an integrated value of the integrating circuit to rapidly change when said input signal at the output of said comparator means inverts and while said AND gate is actuated, said capacitor is arranged to be charged by said "rich" or "lean" input signal before said input signal inverts, causing said Miller integrator output to decrease at a constant rate, and to be discharged when said input signal inverts, causing said Miller integrator output to reach said upper limit in a time proportional to the duration of the preceding said "rich" or "lean" input signal prior to shifting, said comparator being adapted to change its output signal when said upper limit is reached at said Miller integrator output, whereupon said AND gate is deactuated to inactivate said skip gate means.

2. The air-fuel ratio control device as set forth in claim 1, wherein one of said skip circuits further includes an inverting circuit operatively connected between said output of said comparator means and said another input of said AND gate.

3. The air-fuel ratio control device as set forth in claim 2, wherein said comparator constitutes an operational amplifier, said skip gate means comprises a transistor, two diodes each connected in opposite conducting directions between said Miller integrators of said skip circuits, respectively, and said output of said comparator means.

4. The air-fuel ratio control device as set forth in claim 1, wherein one of said Miller integrators of one of said skip circuits includes a diode and a zener diode connected in series facing each other in their conducting directions and across said capacitor between the Miller integrator output and an inverting input of said Miller integrator, said inverting input being connected to said output of said comparator means.

* * * * *

UNITED STATES PATENT AND TRADEMARK OFFICE
CERTIFICATE OF CORRECTION

PATENT NO. : 4,300,505

DATED : November 17, 1981

INVENTOR(S) : Shigetaka Takada et al.

It is certified that error appears in the above—identified patent and that said Letters Patent is hereby corrected as shown below:

Figure 1 should appear as shown on the attached sheet.

Signed and Sealed this

Eighteenth Day of May 1982

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,300,505

DATED : November 17, 1981

INVENTOR(S) : Shigetaka Takada et al.

Page 2 of 2

It is certified that error appears in the above—identified patent and that said Letters Patent is hereby corrected as shown below:

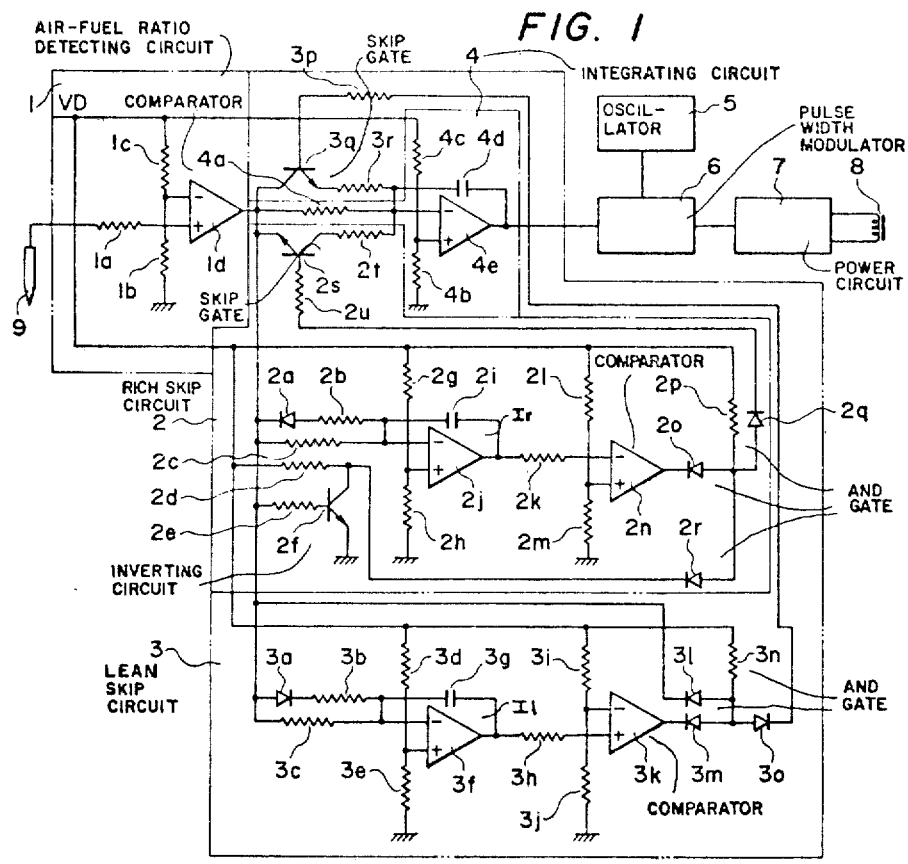

FIG. 1